(12) United States Patent
Forristal et al.

(10) Patent No.: US 8,984,316 B2
(45) Date of Patent: Mar. 17, 2015

(54) FAST PLATFORM HIBERNATION AND RESUMPTION OF COMPUTING SYSTEMS PROVIDING SECURE STORAGE OF CONTEXT DATA

(75) Inventors: Jeff Forristal, Hillsboro, OR (US); Faraz Siddiqi, Portland, OR (US); Lukasz Mielicki, Gdansk (PL); Hao-Chi Wong, San Carlos, CA (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 13/340,558

(22) Filed: Dec. 29, 2011

(65) Prior Publication Data

US 2013/0173942 A1 Jul. 4, 2013

(51) Int. Cl.
*G06F 1/00* (2006.01)
*G06F 1/32* (2006.01)

(52) U.S. Cl.
CPC ........................................ *G06F 1/32* (2013.01)
USPC ........................................................ 713/323

(58) Field of Classification Search
CPC ........................................................ G06F 1/32
USPC ................................................ 713/300, 320
See application file for complete search history.

(56) References Cited

U.S. PATENT DOCUMENTS

| 6,131,166 | A | 10/2000 | Wong-Insley |
| 6,901,298 | B1 | 5/2005 | Govindaraj et al. |
| 6,968,469 | B1 | 11/2005 | Fleischmann et al. |
| 7,100,037 | B2 | 8/2006 | Cooper |
| 7,152,169 | B2 | 12/2006 | Cooper et al. |
| 7,210,045 | B2 * | 4/2007 | Dunstan ........................ 713/300 |
| 7,293,183 | B2 | 11/2007 | Lee et al. |
| 7,310,725 | B2 | 12/2007 | Zimmer et al. |
| 7,484,109 | B2 * | 1/2009 | Feldman et al. .............. 713/300 |
| 7,725,746 | B2 | 5/2010 | Lee et al. |
| 7,730,330 | B1 | 6/2010 | Fleischmann et al. |
| 7,971,071 | B2 | 6/2011 | Walkoe et al. |
| 7,971,081 | B2 | 6/2011 | Cooper et al. |

(Continued)

FOREIGN PATENT DOCUMENTS

| JP | 10-207588 | 8/1998 |
| JP | 10-320302 | 12/1998 |

(Continued)

OTHER PUBLICATIONS

Office Action from JP2010-540707 mailed Nov. 15, 2011, 9 pgs.

(Continued)

*Primary Examiner* — Mohammed Rehman
(74) *Attorney, Agent, or Firm* — Blakely, Sokoloff, Taylor & Zafman LLP

(57) ABSTRACT

Secure fast platform hibernation and resumption for computing systems. An embodiment of an apparatus includes a processor to operate according to an operating system, the processor to transition the apparatus to a first reduced power state in response to a request, the transition to the first reduced power state including the processor to store context data for the apparatus in a volatile system memory, and logic to transition the apparatus to a second reduced power state, the logic to write the context data from the volatile system memory to a nonvolatile memory for the transition to the second reduced power state, wherein the logic is to implement one or more security measures for the writing of the context data into the nonvolatile memory.

30 Claims, 10 Drawing Sheets

(56) References Cited

U.S. PATENT DOCUMENTS

| | | | |
|---|---|---|---|
| 8,694,814 | B1 | 4/2014 | Salomon et al. |
| 2003/0028765 | A1* | 2/2003 | Cromer et al. ............... 713/164 |
| 2003/0233591 | A1 | 12/2003 | Chiteboun et al. |
| 2004/0003223 | A1 | 1/2004 | Fortin et al. |
| 2004/0025045 | A1 | 2/2004 | Chan |
| 2004/0034765 | A1 | 2/2004 | O'Connell |
| 2005/0149646 | A1 | 7/2005 | Kadatch et al. |
| 2006/0200691 | A1 | 9/2006 | Yomo et al. |
| 2007/0136523 | A1* | 6/2007 | Bonella et al. ............... 711/113 |
| 2007/0288687 | A1 | 12/2007 | Panabaker |
| 2008/0028243 | A1* | 1/2008 | Morisawa ............... 713/323 |
| 2009/0024843 | A1 | 1/2009 | Choi |
| 2009/0172439 | A1* | 7/2009 | Cooper et al. ............... 713/323 |
| 2009/0208002 | A1* | 8/2009 | Koehane et al. ............... 380/44 |
| 2009/0240954 | A1* | 9/2009 | Figueroa et al. ............... 713/193 |
| 2010/0037076 | A1 | 2/2010 | Reece et al. |
| 2010/0100747 | A1* | 4/2010 | Boscher et al. ............... 713/187 |
| 2010/0211731 | A1* | 8/2010 | Mittendorff et al. ........... 711/113 |
| 2011/0231595 | A1 | 9/2011 | Wakrat et al. |
| 2012/0143877 | A1* | 6/2012 | Kumar et al. ............... 707/747 |
| 2013/0031388 | A1* | 1/2013 | Sakarda ............... 713/320 |
| 2013/0067137 | A1 | 3/2013 | Molloy |
| 2013/0173942 | A1 | 7/2013 | Forristal et al. |
| 2013/0212317 | A1 | 8/2013 | Traister et al. |
| 2013/0290760 | A1 | 10/2013 | Cooper et al. |
| 2014/0164675 | A1 | 6/2014 | Ehrlich et al. |
| 2014/0215249 | A1* | 7/2014 | Kawakami ............... 713/323 |

FOREIGN PATENT DOCUMENTS

| | | |
|---|---|---|
| JP | 2004-227085 | 8/2004 |
| JP | 2006-079468 | 3/2006 |
| KR | 20050040498 | 5/2005 |
| TW | 538333 | 6/2003 |

OTHER PUBLICATIONS

"Advanced Configuration and Power Interface Specification", Hewlett-Packard Corporation et al., Revision 3.0b, Oct. 10, 2006 cover page, p. ii, pp. 402-415., (Oct. 10, 2006), 15 pages.

"Intel® NAND Flash Memory for Intel® Turbo Memory White Paper", Intel Corporation.

"International Search Report for corresponding matter", International Search Report for corresponding matter P25690PCT, mailed Apr. 28, 2009.

Office Action from CN Patent No. 200880123248.X mailed Jan. 19, 2012, 17 pages.

Hewlett-Packard Corp, Intel Corp, Microsoft Corp, Phoenix Technologies Ltd., Toshiba Corp, "Advanced Configuration and Power Interface Specification," Revision 3.0B, Section 15, pp. 9-23, Oct. 10, 2006.

Office Action from CN Patent No. 200880123248.X, dated Nov. 24, 2011, 17 pages.

Hewlett-Packard Corp, Intel Corp, Microsoft Corp, Phoenix Technologies Ltd., Toshiba Corp, "Advanced Configuration and Power Interface Specification," Revision 3.0B, Section 15, pp. 402-415, Oct. 10, 2006.

International Search Report and Written Opinion mailed May 4, 2012, in International Application No. PCT/US2011/054473, 9 pages.

First Office Action (+English translation) in Taiwan Patent Application No. 097147665, 21 pages.

Office Action dated Aug. 2, 2012 (+English translation), in Chinese Patent Application No. 200880123248.X., 6 pages.

Office Action dated May 15, 2013 (+English translation), in Taiwan Patent Application No. 097147665, 4 pages.

Office Action in German Patent Application No. 112008003520.2 mailed Feb. 1, 2012, 6 pages.

Office Action mailed Oct. 8, 2014, in U.S. Appl. No. 13/730,575, 15 pages.

* cited by examiner

FAST PLATFORM HIBERNATION AND RESUMPTION OF COMPUTING SYSTEMS PROVIDING SECURE STORAGE OF CONTEXT DATA

TECHNICAL FIELD

Embodiments of the invention generally relate to the field of computing systems and, more particularly, to fast hibernation and resumption of computing systems.

BACKGROUND

Computing system may be transferred between various power states. In general, each power state provides for the powering down of certain elements of the computing system during period of inactivity. Lower states generally provide further power savings, but also required additional time to return to operation.

For example, power states may include state referred to as S-states, including S3 and S4. S3, sometimes referred to as Standby, Sleep, or Suspend to RAM, is a sleep state in which the operating system (OS) of a computing system saves the context of the system into physical memory (dynamic random access memory, or DRAM) and puts the computing system into a suspend state. In this operation, open documents and programs (applications) (or a portion thereof) that were used at the time of entering into S3 are also saved in DRAM during the suspend state. Further, contents of some chipset registers may also be written to DRAM. The physical memory (DRAM) may be referred to as main memory or system memory. During the S3 state, power is removed from the platform hardware, with the exception of the DRAM and a small amount of circuitry used to later wake the system. The S3 power state provides a relatively fast suspend resume (wake) time due to its ability to save and restore OS context and previously used programs and documents from hi-speed DRAM memory.

S4, sometimes referred to as Hibernate, Safe Sleep, or Suspend to disk, provides that the OS context and open documents and programs (or a portion thereof) are saved on non-volatile memory such as a hard disk drive (HDD) rather than in fast DRAM memory. This allows for higher power savings than the S3 state because the DRAM is not kept powered. However, there are higher latencies due to slow read and write access times of the HDD.

Further, the saving of memory contents to non-volatile memory may result in security issues if the data is available to insecure elements in the storage of such data in the non-volatile memory.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
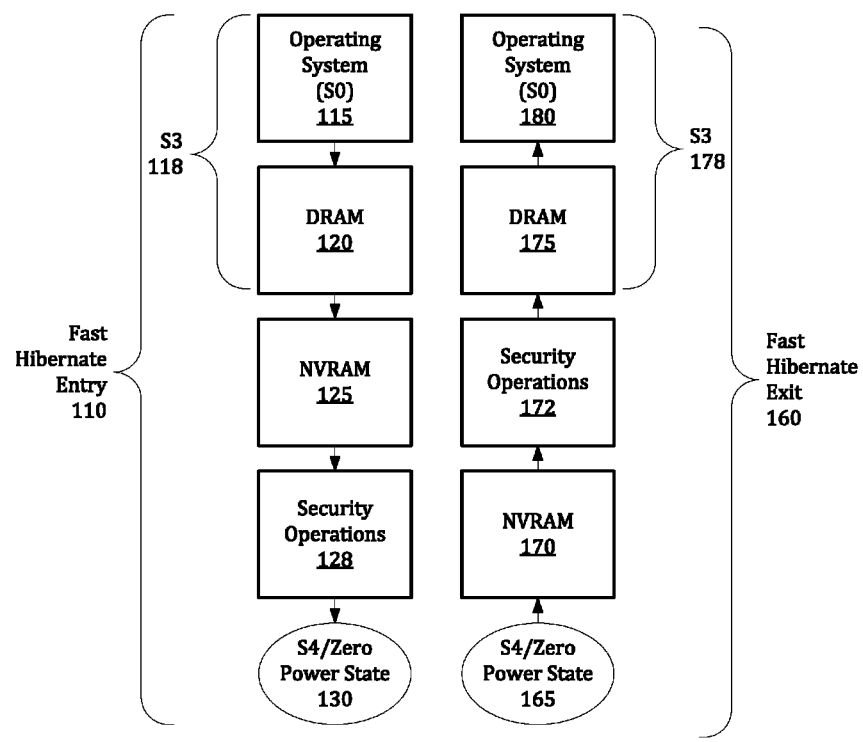
FIG. 1 illustrates embodiments of processes for a computer platform to enter into a fast hibernate state and to exit the fast hibernate state.

Embodiments of the invention are generally directed to secure fast platform hibernation and resumption for computing systems.

In some embodiments, an apparatus, system, or method (such as a computing apparatus, system, or method) provides an enhanced process for secure fast platform hibernation and resumption.

In operation, Fast Flash Standby (FFS) is a BIOS module that works in tandem with a solid state drive (SSD) to transparently treat an S3 power level as an S4 power level. Computer platform hibernation and resumption is described in, for example, U.S. Pat. No. 7,971,081, "System and Method for Fast Platform Hibernate and Resume".

Power management logic or BIOS of an apparatus or system may include saving volatile system memory (DRAM—dynamic random-access memory) contents to a storage medium, such as a local hard disk drive, solid state drive, or other local or remote storage medium, in order to enter into a power mode that would otherwise cause volatile system memory data loss. In an example, the BIOS of a computing apparatus or system may include operating under the appearance (to the operating system, or OS) of an S3 system sleep state, but in actuality the BIOS will save the memory contents to a storage medium and enter an S4 or S5 system sleep state to provide larger power savings.

In resuming operation, the memory contents are transferred to provide an appearance to the OS of a resumption from S3. Such a process, referred to as fast platform hibernation and resumption, allows for additional power savings without requiring a modification of the operating system. In some embodiments, as part of the process, a small amount of system context data is written into a smaller non-volatile memory location (such as RTC CMOS).

However, there is a need to ensure the memory contents stored to a persistent storage medium are not subject to tampering while it is being stored. In some embodiments, an apparatus, system, or method provides for a secure fast platform hibernation and resumption.

In some embodiments, security-specific extensions for an apparatus, system, or process involve one or more of cryptographic hashing of memory contents and the storage of the cryptographic hash; substitution of non-volatile drive password for a different pre-generated one; and encryption of memory contents before such contents are moved into storage.

In some embodiments, an apparatus, system or method includes at least two portions: An element or process to transparently and securely store the system memory onto the persistent storage medium; and an element or process to securely recover the system memory from the persistent storage medium and replace it back into memory.

In some embodiments, the storage process and restore process are enabled by power management logic or by system BIOS. In some embodiments, a storage process may be independently initiated or initiated at the operation system's (OS's) request.

In some embodiments, a secure fast platform hibernate process enabled by a power management logic or BIOS includes the following:

(a) The power management logic or BIOS locates a suitable non-volatile storage medium, which may be a solid-state drive (SSD), hard disk drive (HDD), or other non-volatile or persistent storage medium, and determines a location on the storage medium that is sufficiently large to hold memory (DRAM) contents for the fast hibernate process.

(b) In some embodiments, optionally for security, the power management logic or BIOS ensures that the apparatus or system is in an operational state that has all unnecessary devices disabled, and that all software other than BIOS is inactive.

(c) In some embodiments, optionally for security, the power management logic or BIOS removes or encrypts any sensitive information currently in volatile system memory. In some embodiments, if encryption is chosen, a temporary encryption key is generated and subsequently stored in a smaller non-volatile platform storage location, such as RTC CMOS (Real Time Clock Complementary Metal-oxide-Semiconductor). In some embodiments, for security, the smaller non-volatile platform storage location is inaccessible to all relevant entities except the power management logic or BIOS.

(d) Power management logic/BIOS copies volatile system memory contents to the non-volatile storage location, either directly or via indirect means such as device DMA. In some embodiments, the non-volatile system memory contents may optionally be encrypted before or during the copy process by the power management logic or BIOS or the non-volatile storage device for any memory contents that have a confidentiality requirement or concern. In some embodiments, the encryption may be performed explicitly by the power management logic or BIOS or transparently in the non-volatile storage device (such as full disk encryption), with any necessary encryption keys being stored in a smaller non-volatile platform storage location. In some embodiments, for security the smaller non-volatile platform storage location is inaccessible to all relevant entities except the power management logic or BIOS.

(e) In some embodiments, the power management logic or BIOS calculates a cryptographic hash over all or portions (such as security integrity sensitive portions) of volatile system memory, and stores the cryptographic hash in a smaller non-volatile platform storage location (such as the RTC CMOS). In some embodiments, for security the smaller non-volatile platform storage location is inaccessible to all relevant entities except the power management logic or BIOS.

(f) In some embodiments, optionally for security the power management logic or BIOS backs up the user's non-volatile storage device password (if applicable, where the process may include ATA Security capability) to smaller non-volatile platform storage location, generates a new random device password, stores the new password to a smaller non-volatile platform storage location, and then changes the non-volatile storage device password to use the new password (thus temporarily disabling user access via the user's password).

(g) The power management logic or BIOS transitions the apparatus or system into an S4 or S5 sleep state.

In some embodiments, upon receiving a power-on event (power button, RTC alarm, or other event) the power management logic or BIOS initiates a resume or restore process from a secure fast platform hibernate process, where the resume or restore process includes:

(a) In some embodiments, optionally for security the power management logic or BIOS ensures the apparatus or system is in an operational state that has all unnecessary devices disabled, and that all software other than BIOS is inactive.

(b) The power management logic or BIOS locates the storage medium used during the save process.

(c) In some embodiments, optionally for security the apparatus of system recovers the temporary non-volatile storage device password from the smaller non-volatile platform storage; uses the password as appropriate to unlock the non-volatile storage device recover the user's previous non-volatile storage device password from the smaller non-volatile platform storage; and changes the non-volatile storage device password back to use the user's password.

(d) The power management logic or BIOS copies the contents of the non-volatile storage device back into volatile system memory, either directly or via indirect means, such as device DMA (Direct Memory Access).

(e) In some embodiments, the power management logic or BIOS removes or deletes the contents from the non-volatile storage device, where the removal or deletion may include explicit overwriting, "throwing away" an encryption key (making the contents unrecoverable), or using a device-specific feature such as ATA Trim command.

(f) In some embodiments, the power management logic or BIOS calculates a cryptographic hash over all or portions of the volatile system memory, using same regions or ranges or memory that were hashed during the storage process (e).

(g) In some embodiments, the power management logic or BIOS compares the calculated cryptographic hash to the previously saved hash value stored in smaller non-volatile platform storage. If the comparison fails, there is an integrity issue with the contents in the non-volatile storage device, and BIOS should not proceed to use the memory. In some embodiments, an appropriate error response may include resetting the apparatus or system platform and performing a cold boot to freshly establish new memory contents from scratch.

(h) In some embodiments, the power management logic or BIOS clears out all relevant information that was stored in smaller non-volatile platform storage.

(i) In some embodiments, the power management logic or BIOS proceeds to perform a system restore (such as an S3 resume) as normal, thereby appearing to the OS as though the apparatus or system is returning from an S3 system sleep state, rather than the S4 or S5 system sleep state.

In some embodiments, an apparatus, system, or method provides for fast platform hibernation in which a system context is written into a nonvolatile memory (a smaller nonvolatile memory or NVRAM), which has a smaller capacity than another nonvolatile memory (the larger nonvolatile memory or hard disc drive) that is used to store at least one operating system, programs, and data. In a resume from fast hibernate, the system context is read from the smaller nonvolatile memory and used to restore operation of a computer system. In some embodiments, the system context is transferred entirely from DRAM system memory to the smaller nonvolatile memory and on resume transferred entirely from the smaller nonvolatile memory to the DRAM system memory. In other embodiments, the system context can come partly from other memory such as chipset registers and be written back directly to those registers rather than go indirectly through the DRAM.

In some embodiments, in the fast hibernate process, the transfer from the DRAM system memory to the smaller non-volatile memory occurs even after processor cores and other system components such as a hard drive and display screen are powered down. This allows the user of the computer to have the perception that the computer system is shut down quickly, even though the transfer of the system context has not been completed. Accordingly, embodiments improve the user perception of the system responsiveness.

In some embodiments, a fast hibernate process utilizing an operating system that is designed for S3 (a first reduced power state) and S4 (a second reduced power state) states, but not specifically designed for the fast hibernate process. This may occur by having the BIOS and/or another mechanism respond to a suspend to RAM (S3) command by putting the processor into a system management mode (SMM), and controlling the transfer from the DRAM system memory to the smaller non-volatile memory and then changing a sleep type to hibernate state. In these embodiments, the process may be transparent to the operating system.

FIG. 1 illustrates embodiments of processes for a computer platform to enter into a fast hibernate state and to exit the fast hibernate state. In this illustration, the fast hibernate state entry 110 commences with an operating system at an operational (S0) 115 state transitioning to a sleep (S3 118) state, including the storing of context data to volatile DRAM memory 120. The fast hibernate process further includes copying or writing the context information from the DRAM to NVRAM 125. In some embodiments, the fast hibernate process further includes one or more security operations 128 to ensure that the memory contents are not subject to tampering while such data is being stored. The storage to nonvolatile memory allows for transition of the platform to a hibernate (S4) state or, optionally, a zero power state 130.

In some embodiments, the fast hibernate exit process 160 begins with S4 or zero power state 165. In some embodiments, upon waking of logic such as power management logic or BIOS, the content of the NVRAM 170 is to be restored to the DRAM 175, where the restoring of the data includes one or more security operations 172 in connection with the secure store of the data. The loading of the context data into the DRAM 175 then puts the data in the proper location for restoring the context data using the sleep state (S3 178) processes, thereby returning the operating system 180 to the operational (S0) state.

Figure 2:
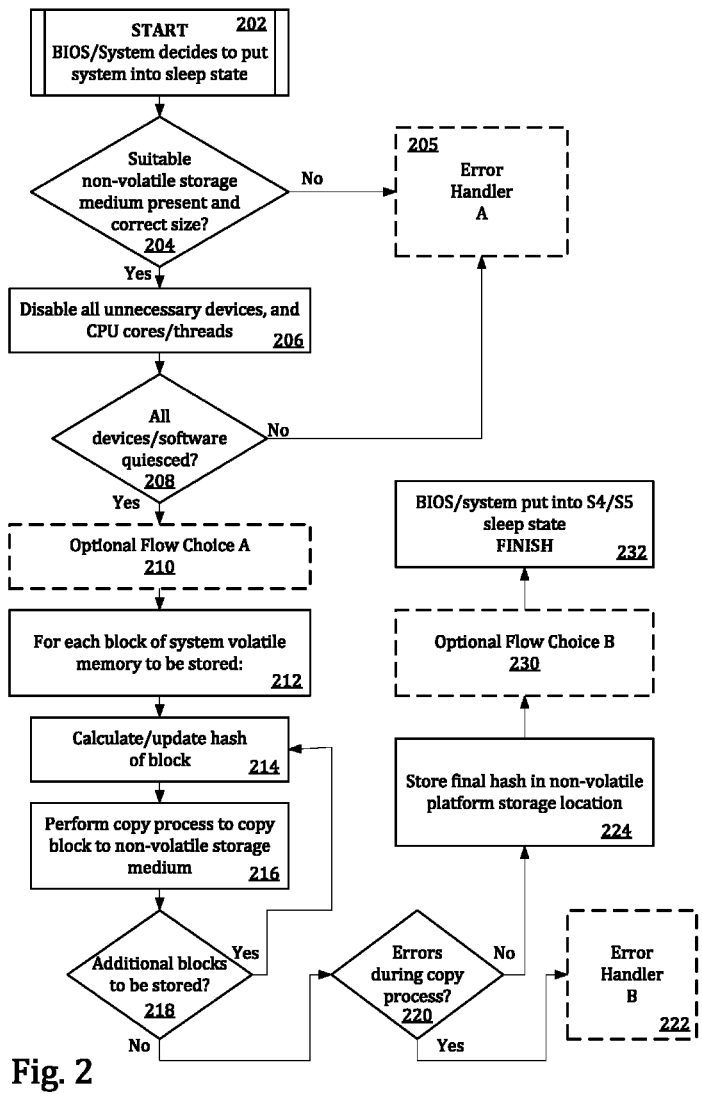
FIG. 2 is an illustration of an embodiment of a process for secure fast platform hibernation.

FIG. 2 is an illustration of an embodiment of a process for secure fast platform hibernation. In some embodiments, a BIOS or system determines to put the system into a sleep state 202. If there is not a suitable storage medium present with the correct size 204, then the system may enter an error handling process (error handler A) 205 illustrated in FIG. 5. If the storage medium is available, then all unnecessary devices are disabled, as well as CPU cores and threads 206. If all devices and software have not quiesced 208, the system may again end the error handling process 205. If devices and software have quiesced, then the process may engage in an optional flow (optional flow choice A) to implement security elements 210, as illustrated in FIG. 3.

In some embodiments, for each block of memory to be stored 212, there is a calculation or update of a hash of the block 214 and performing a copy process to copy the block to the nonvolatile storage medium 216. When there are no additional blocks remaining to be stored 218, if any errors occurred during the copy process 220, then the process may continue to error handling (error handler B) 222 as illustrated in FIG. 5. If not, then the final hash is stored in the nonvolatile platform storage location 224. The process may continue with a second optional flow (optional flow choice B) to implement security elements 230, as illustrated in FIG. 4, and then the BIOS or system may place the system into the S4 or S5 sleep state 232.

Figure 3:
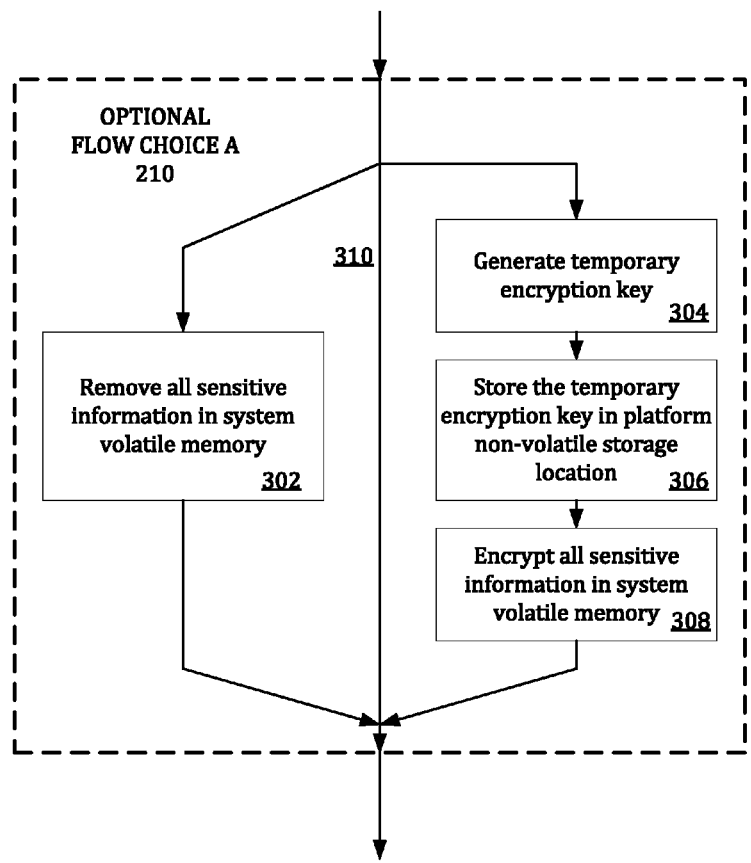
FIG. 3 is an illustration of an embodiment of security operations for secure fast platform hibernation.

FIG. 3 is an illustration of an embodiment of security operations for secure fast platform hibernation. In some embodiments, the optional process flow 210 includes: A first option providing for removing all sensitive information in the system volatile memory 302; a second option providing for generating a temporary encryption key 304, storing the temporary encryption key in the nonvolatile platform storage location 306, and encrypting all sensitive information in the system volatile memory 308; and a third option bypassing the security options 310.

Figure 4:
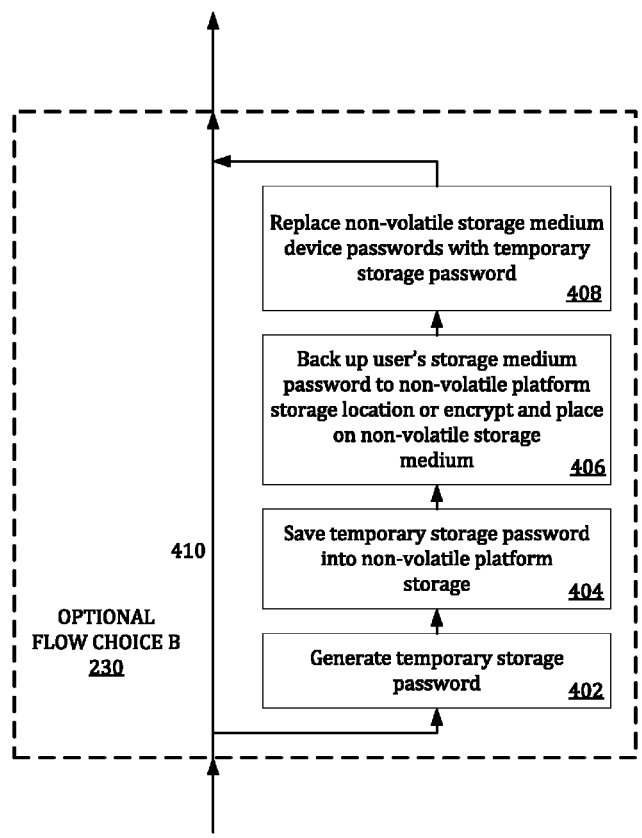
FIG. 4 is an illustration of an embodiment of security operations for secure fast platform hibernation.
Figure 5:
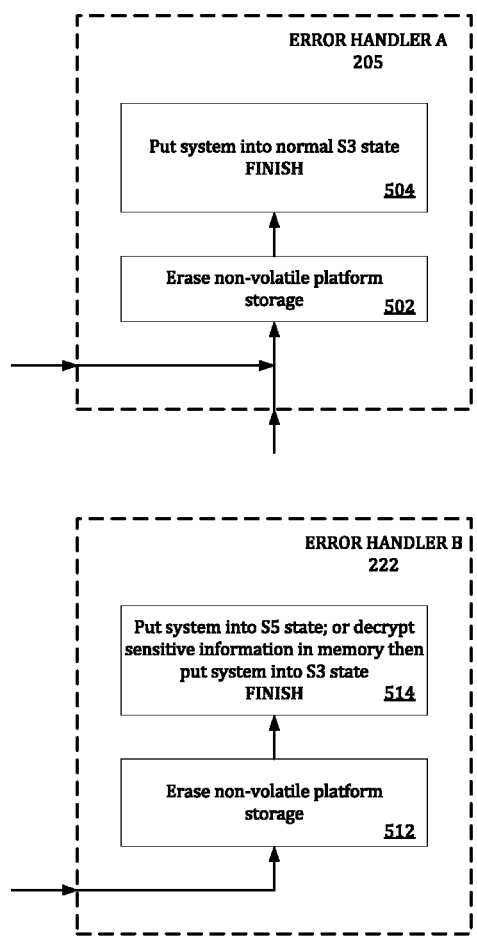
FIG. 5 is an illustration of an embodiment of error handling for secure fast platform hibernation.

FIG. 4 is an illustration of an embodiment of security operations for secure fast platform hibernation. In some embodiments, the optional process flow 230 includes: A first option providing for generating a temporary storage password 402, replacing non-volatile storage medium passwords with a temporary storage password, saving the temporary password into the non-volatile platform storage 404, backing up the user's storage password to the nonvolatile platform storage location or encrypting the password and placing it on the nonvolatile storage medium 406, and replacing the non-volatile storage medium passwords with the temporary storage password 408; and a second option of bypassing the security elements 410.

FIG. 5 is an illustration of an embodiment of error handling for secure fast platform hibernation. For error handling 205, the process includes erasing the nonvolatile platform storage 502, and putting the system into a normal S3 state 504.

For error handling 222, the process includes erasing the nonvolatile platform storage 512 and putting the system into an S5 state, or decrypting sensitive information in memory and placing the system into the normal S3 state 514.

Figure 6:
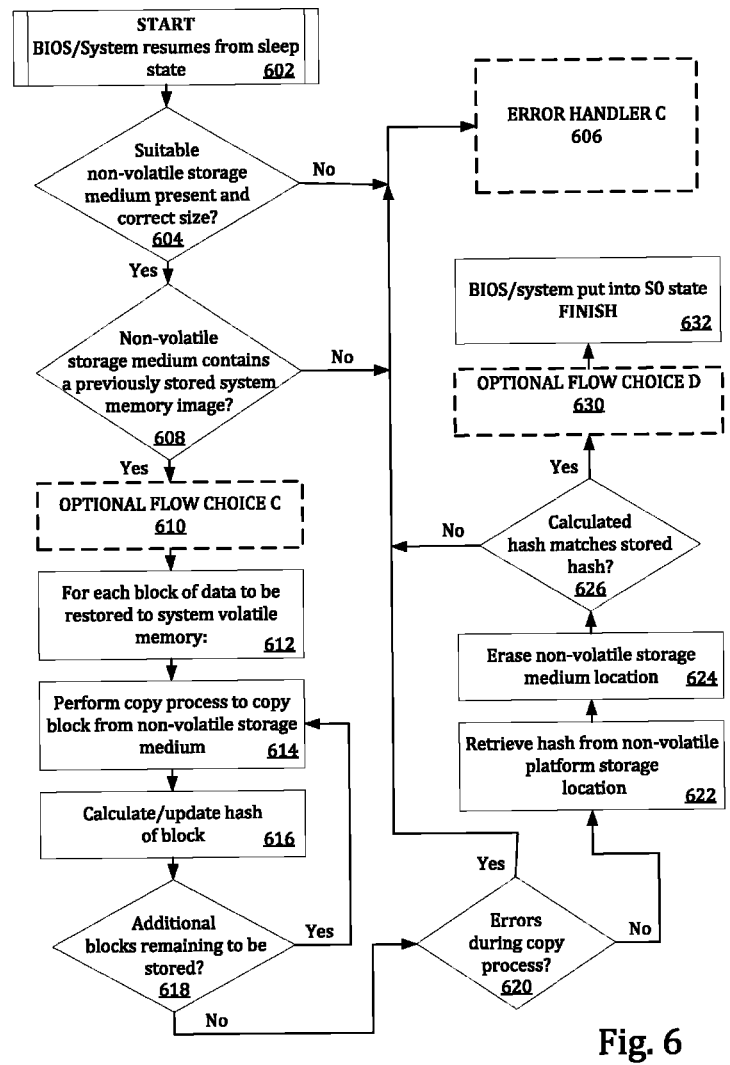
FIG. 6 is an illustration of an embodiment of a process for resumption from secure fast platform hibernation.

FIG. 6 is an illustration of an embodiment of a process for resumption from secure fast platform hibernation. In some embodiments, a BIOS or system resumes the system from a sleep state 602. If there was no suitable nonvolatile storage medium present with a correct size 604 or the nonvolatile storage medium does not contain a previously stored system memory image 608, then the process proceeds with an error handling process (error handler C) 606 illustrated in FIG. 9. Otherwise, there is an optional process flow for security elements (optional flow choice C) 610 as illustrated in FIG. 7.

In some embodiments, for each block of data to be restored to system volatile memory 612, a copy process is performed to copy a block from the nonvolatile storage medium 614 and there is a calculation or updating of a hash for each block 616 until there are no additional blocks remaining to be stored 618. If any errors occur in the copy process 620, the process continues with the error handling process 606. If there were no errors, then the hash is retrieved from the nonvolatile storage location 622 and the nonvolatile storage medium location is erased 624. If the calculated hash does not match the stored hash 626, then the error handling process 606 is followed. If the calculated hash matches the stored hash 626, then the process continues with an optional process flow for security elements (optional flow choice D) 630 and the BIOS or system returns the system to the operational S0 state 632.

Figure 7:
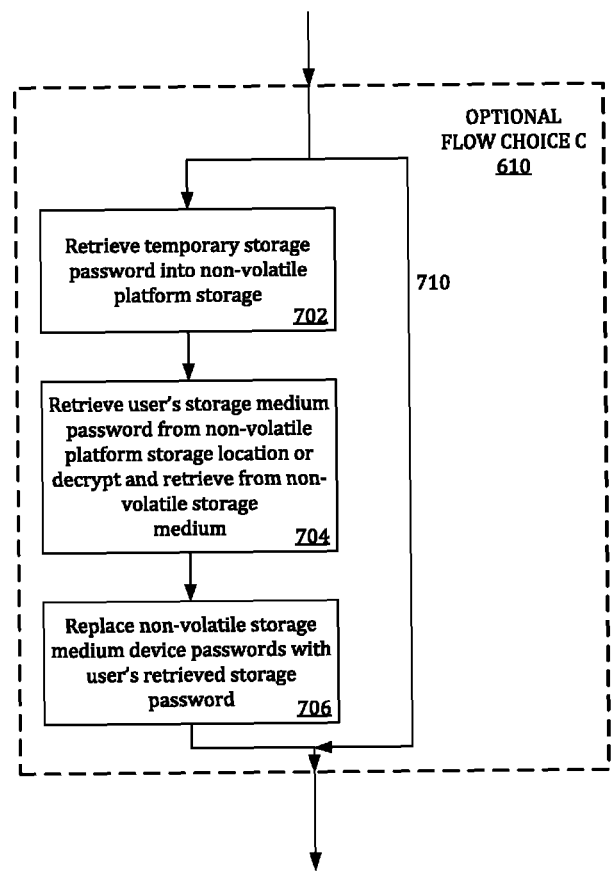
FIG. 7 is an illustration of an embodiment of security operations for resumption from secure fast platform hibernation.

FIG. 7 is an illustration of an embodiment of security operations for resumption from secure fast platform hibernation. In some embodiments, the optional process flow 610 includes: A first option providing for retrieving the temporary storage password into the nonvolatile platform storage 702, retrieving the user's storage medium password from the nonvolatile platform storage location or decrypting and retrieving the password from the nonvolatile storage medium 704, and replacing the nonvolatile storage medium device passwords with the user's retrieved storage password 706; or a second option bypassing the security elements 710.

Figure 8:
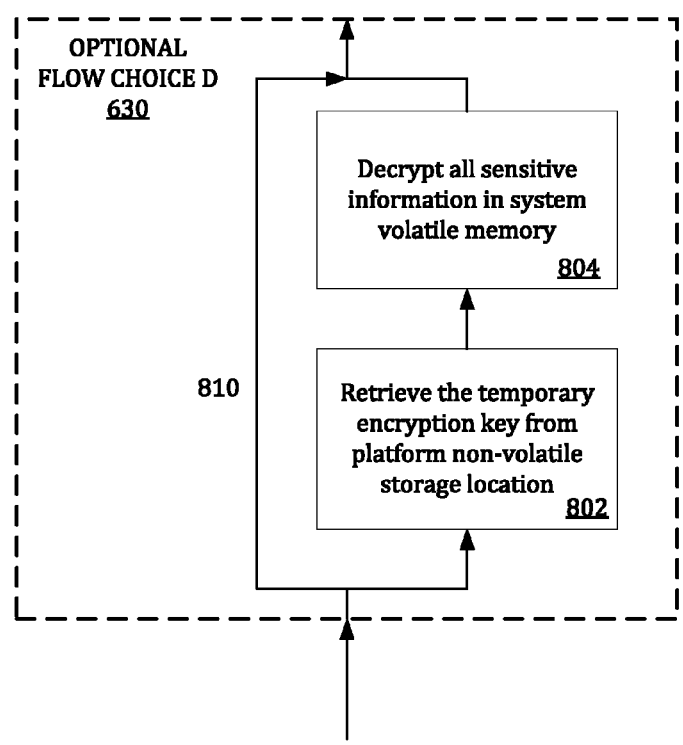
FIG. 8 is an illustration of an embodiment of security operations for resumption from secure fast platform hibernation.

FIG. 8 is an illustration of an embodiment of security operations for resumption from secure fast platform hibernation. In some embodiments, the optional process flow 630 includes: A first option providing for retrieving the temporary encryption key from the platform nonvolatile storage location 802, and decrypting all sensitive information in the system volatile memory 804; and a second option of bypassing the security elements 810.

Figure 9:
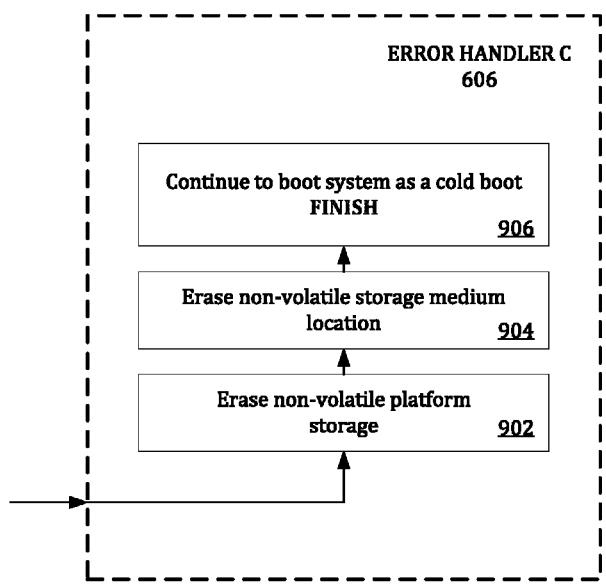
FIG. 9 is an illustration of an embodiment of error handling for resumption from secure fast platform hibernation.

FIG. 9 is an illustration of an embodiment of error handling for resumption from secure fast platform hibernation. In some embodiments, the error handling process 606 includes erasing the nonvolatile platform storage 902, erasing the nonvolatile storage medium location 904, and continuing to boot the system as a cold boot to start over without stored data 906.

Figure 10:
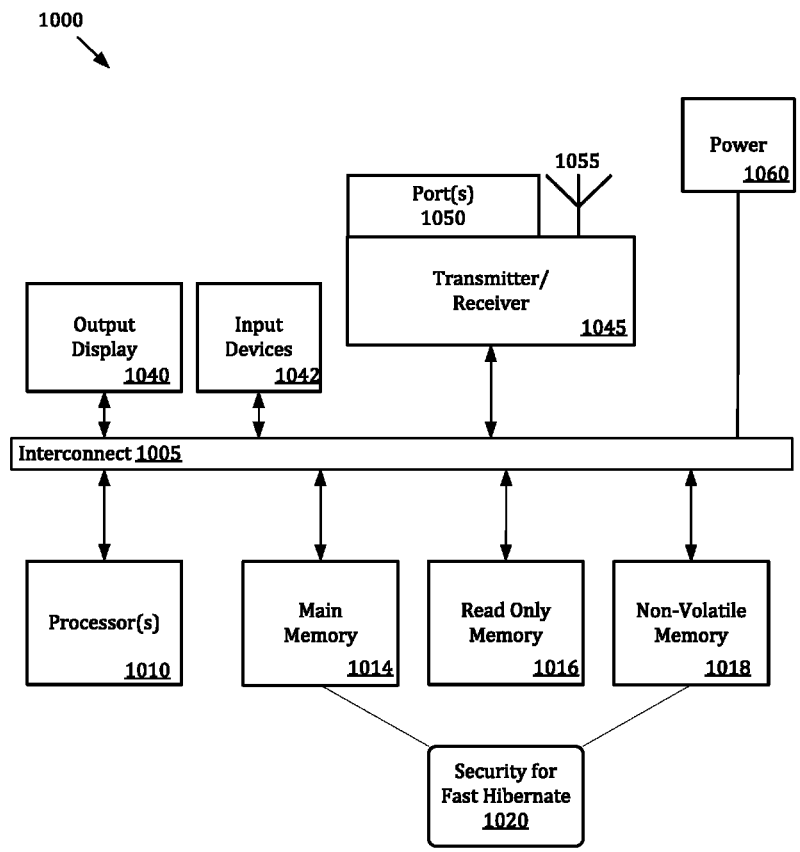
FIG. 10 illustrates an embodiment of a computing system that provides for secure fast platform hibernation and resumption.

FIG. 10 illustrates an embodiment of a computing system that provides for secure fast platform hibernation and resumption. In this illustration, certain standard and well-known components that are not germane to the present description are not shown. Under some embodiments, the computing system 1000 comprises an interconnect or crossbar 1005 or other communication means for transmission of data. The computing system 1000 may include a processing means such as one or more processors 1010 coupled with the interconnect 1005 for processing information. The processors 1010 may comprise one or more physical processors and one or more logical processors. The interconnect 1005 is illustrated as a single interconnect for simplicity, but may represent multiple different interconnects or buses and the component connections to such interconnects may vary. The interconnect 1005 shown in FIG. 10 is an abstraction that represents any one or more separate physical buses, point-to-point connections, or both connected by appropriate bridges, adapters, or controllers.

In some embodiments, the computing system 1000 further comprises a random access memory (RAM) or other dynamic storage device or element as a main memory 1014 for storing information and instructions to be executed by the processors 1010. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory. The computing system 1000 also may comprise a read only memory (ROM) 1016 or other static storage device for storing static information and instructions for the processors 1010. The computing system 1000 may include one or more nonvolatile memory elements 1018 for the storage of certain elements, such as an SSD or HDD. In some embodiments, the nonvolatile memory elements 1018 include nonvolatile memory for the storage of context data in a fast hibernation process. In some embodiments, the computing system 1000 includes one or more elements for security in the fast hibernation process, where the elements include elements to provide one or more of cryptographic hashing of memory contents and the storage of the cryptographic hash; substitution of non-volatile drive password for a different pre-generated one; and encryption of memory contents before such contents are moved into storage.

The computing system 1000 may also be coupled via the interconnect 1005 to an output display 1040. In some embodiments, the display 1040 may include a liquid crystal display (LCD) or any other display technology, for displaying information or content to a user. In some environments, the display 1040 may include a touch-screen that is also utilized as at least a part of an input device. In some environments, the display 1040 may be or may include an audio device, such as a speaker for providing audio information. The computer system 1000 may further include one or more input devices 1042, such as a keyboard, mouse or other pointing device, a microphone for audio commands, and other input devices.

One or more transmitters or receivers 1045 may also be coupled to the interconnect 1005. In some embodiments, the computing system 1000 may include one or more ports 1050 for the reception or transmission of data. The computing system 1000 may further include one or more omnidirectional or directional antennas 1055 for the reception of data via radio signals.

The computing system 1000 may also comprise a power device or system 1060, which may comprise a power supply, a battery, a solar cell, a fuel cell, or other system or device for providing or generating power. The power provided by the power device or system 1060 may be distributed as required to elements of the computing system 1000. In some embodiments, the power system 1060 may include or may work with a power management logic, where such power management logic may provide for functions or processes connected with a fast platform hibernate and resumption.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a non-transitory computer-readable storage medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
    a processor to operate according to an operating system, the processor to transition the apparatus to a first reduced power state in response to a request, the transition to the first reduced power state including the processor to store context data for the apparatus into a volatile system memory; and
    power management logic to transition the apparatus to a second reduced power state, the power management logic to write the context data from the volatile system memory to a first nonvolatile memory for the transition to the second reduced power state, wherein the power management logic is to implement one or more security measures for the write of the context data into the first nonvolatile memory and for the recovery of the context data from the first nonvolatile memory, the one or more security measures including the power management logic to store a security element for the context data, the security element being an encryption key or password required to access the context data stored in the first nonvolatile memory, the power management logic to store the encryption key or password in a second nonvolatile memory;
    wherein the second nonvolatile memory is inaccessible to any entities other than the power management logic.

2. The apparatus of claim 1, wherein the one or more security measures further include generation of a cryptographic hash of memory contents and the storage of the cryptographic hash in the second nonvolatile memory by the power management logic.

3. The apparatus of claim 1, wherein the one or more security measures include substitution of a non-volatile drive password for a different generated password and storage of the generated password as the security element in the second nonvolatile memory by the power management logic.

4. The apparatus of claim 1, wherein the one or more security measures include encryption of memory contents before such contents are copied into the first nonvolatile memory using a temporary encryption key and storage of the temporary encryption key as the security element in the second nonvolatile memory by the power management logic.

5. The apparatus of claim 1, wherein the power management logic is further to restore the context data from the first nonvolatile memory to the volatile system memory in response to a wake event for the apparatus, the restoration of the context data including retrieval of the encryption key or password from the second nonvolatile memory by the power management logic and the use of the encryption key or password to access the context data stored in the first nonvolatile memory.

6. The apparatus of claim 1, wherein the first reduced power level is an S3 system sleep state.

7. The apparatus of claim 6, wherein the second reduced power level is an S4 system sleep state.

8. The apparatus of claim 6, wherein the second reduced power level is an S5 system sleep state.

9. A method comprising:
    transitioning a computing system to a first reduced power state in response to a request, the first reduced power state including the storage of context data for the computing system in a volatile system memory; and
    transitioning the computing system to a second reduced power state using a power management logic, including writing the context data from the volatile system memory to a first nonvolatile memory for the transition to the second reduced power state, wherein the writing of the context data includes implementing one or more security measures for the writing of the context data into the first nonvolatile memory and for the recovery of the context data from the first nonvolatile memory, the one or more security measures including the power management logic to store a security element for the context data, the security element being an encryption key or password required to access the context data stored in the first nonvolatile memory, the power management logic to store the encryption key or password in a second nonvolatile memory;
    wherein the second nonvolatile memory is inaccessible to any entities other than the power management logic.

10. The method of claim 9, wherein the one or more security measures further include cryptographic hashing of memory contents to generate a cryptographic hash and the storage of the cryptographic hash in the second nonvolatile memory by the power management logic.

11. The method of claim 9, wherein the one or more security measures include substitution of a non-volatile drive password for a different generated password and storage of the generated password as the security element in the second nonvolatile memory by the power management logic.

12. The method of claim 9, wherein the one or more security measures include encryption of memory contents before such contents are copied into the first nonvolatile memory using a temporary encryption key and storage of the temporary encryption key as the security element in the second nonvolatile memory by the power management logic.

13. The method of claim 9, further comprising:
detecting a wake event for the computing system; and
restoring the context data from the first nonvolatile memory to the volatile system memory, the restoration of the context data including retrieval of the encryption key or password from the second nonvolatile memory by the power management logic and the use of the encryption key or password to access the context data stored in the first nonvolatile memory.

14. The method of claim 9, wherein the first nonvolatile memory is an SSD (solid state drive).

15. A system comprising:
a DRAM (dynamic random access memory) memory element;
an SSD (solid state drive) memory element;
a nonvolatile memory element;
a processor to operate according to an operating system, the processor to transition the system to a first reduced power state in response to a request, the first reduced power state including the storage of context data for the system in the DRAM memory element;
power management logic to transition the system between the first reduced power state and a second reduced power state, the power management logic to write the context data from the DRAM element to the SSD memory element for a transition from the first reduced power state to the second reduced power state and to restore the context data from the SSD memory element to the DRAM element for a transition from the second reduced power state to the first reduced power state, wherein the power management logic is to implement one or more security measures for the writing of the context data into the SSD memory element and for the recovery of the context data from the SSD memory element, the one or more security measures including the power management logic to store a security element for the context data, the security element being an encryption key or password required to access the context data stored in the SSD memory element, the power management logic to store the encryption key or password in the nonvolatile memory element;
wherein the nonvolatile memory element is inaccessible to any entities other than the power management logic.

16. The system of claim 15, wherein the one or more security measures further include generation of a cryptographic hash of memory contents and the storage of the cryptographic hash in the nonvolatile element by the power management logic.

17. The system of claim 15, wherein the one or more security measures include substitution of an SSD drive password for a different generated password and storage of the generated password as the security element in the nonvolatile memory element by the power management logic.

18. The system of claim 15, wherein the one or more security measures include encryption of memory contents before such contents are written into the SSD memory using a temporary encryption key and storage of the temporary encryption key as the security element in the nonvolatile memory element by the power management logic.

19. The system of claim 15, wherein the power management logic is further to restore the context data from the SSD memory element to the DRAM memory element in response to a wake event for the system, the restoration of the context data including retrieval of the encryption key or password from the nonvolatile memory element by the power management logic and the use of the encryption key or password to access the context data stored in the SSD memory.

20. The system of claim 15, wherein the first reduced power level is an S3 system sleep state.

21. The system of claim 20, wherein the second reduced power level is an S4 system sleep state.

22. The system of claim 20, wherein the second reduced power level is an S5 system sleep state.

23. A non-transitory computer-readable storage medium having stored thereon data representing sequences of instructions that, when executed by a processor, cause the processor to perform operations comprising:
transitioning a computing system to a first reduced power state upon receipt of a request, the first reduced power state including the storage of context data for the computing system in a volatile system memory; and
transitioning the computing system to a second reduced power state using a power management logic, including writing the context data from the volatile system memory to a first nonvolatile memory for the transition to the second reduced power state, wherein the writing of the context data includes implementing one or more security measures for the writing of the context data into the first nonvolatile memory and for the recovery of the context data from the first nonvolatile memory, the one or more security measures including the power management logic to store a security element for the context data, the security element being an encryption key or password required to access the context data stored in the first nonvolatile memory, the power management logic to store the encryption key or password in a second nonvolatile memory;
wherein the second nonvolatile memory is inaccessible to any entities other than the power management logic.

24. The medium of claim 23, wherein the one or more security measures further include generation of a cryptographic hash of memory contents and storage of the cryptographic hash in the second nonvolatile memory by the power management logic.

25. The medium of claim 23, wherein the one or more security measures include substitution of a non-volatile drive password for a different generated password and storage of the generated password as the security element in the second nonvolatile memory by the power management logic.

26. The medium of claim 23, wherein the one or more security measures include encryption of memory contents before such contents are copied into the first nonvolatile memory using a temporary encryption key and storage of the temporary encryption key as the security element in the second nonvolatile memory by the power management logic.

27. The medium of claim 23, further comprising instructions that, when executed by the processor, cause the processor to perform operations comprising:
restoring the context data from the first nonvolatile memory to the volatile system memory in response to a wake event for the computing system, the restoration of the context data including retrieval of the encryption key or password from the second nonvolatile memory by the power management logic and the use of the encryption key or password to access the context data stored in the first nonvolatile memory.

28. The medium of claim 23, wherein the first reduced power level is an S3 system sleep state.

29. The medium of claim 28, wherein the second reduced power level is an S4 system sleep state.

30. The medium of claim 28, wherein the second reduced power level is an S5 system sleep state.

* * * * *